July 26, 1966

R. JUNG ETAL 3,262,156

SCREW EXTRUDER FOR SPINNING FILAMENTS

Filed April 14, 1965

INVENTORS:
REINHOLD JUNG
GERD ALBRECHT

BY: Marzall, Johnston, Cook+Root
ATT'YS

INVENTORS:
REINHOLD JUNG
GERD ALBRECHT

United States Patent Office 3,262,156
Patented July 26, 1966

3,262,156
SCREW EXTRUDER FOR SPINNING FILAMENTS
Reinhold Jung and Gerd Albrecht, Remscheid-Lennep,
Germany, assignors to Barmer Maschinenfabrik Aktiengesellschaft, Wuppertal-Oberbarmen, Germany
Filed Apr. 14, 1965, Ser. No. 448,172
Claims priority, application Germany, Apr. 21, 1964,
B 76,427
6 Claims. (Cl. 18—12)

This invention relates to a screw extruder of the type employed for spinning filaments from a synthetic polymer. More particularly, the invention is concerned with an improvement in the construction of the screw extruder at that point where the molten polymer leaves the screw and is distributed to one or more spinning heads.

In general, apparatus for spinning a synthetic polymer into continuous filaments includes a screw or worm which is rotatably mounted in a suitable housing or enclosed casing and which acts to convey the relatively viscous molten polymer to at least one spinning head for extrusion into filaments. The screw housing usually includes a heating jacket so that the polymer can be maintained in its molten state at a controlled temperature by means of indirect heat exchange. After the molten polymer is conveyed past the end of the screw, it must be carried by a distributor line or conduit to the point of extrusion, i.e. the spinning heads, and it is also advisable to enclose this distributor line with a heating jacket in order to maintain proper temperature control throughout the extrusion process. In commercial operation, it is necessary to periodically remove the screw or worm from its casing for cleaning purposes or it may be desirable to replace one screw with another. These and similar maintenance problems involve a relatively large expenditure of labor and time with a corresponding loss of filament production.

In order to dismantle the screw in the known constructions of this type of so-called "spinning extruder," two different techniques ordinarily have been followed. In one method, the head or exit end of the screw housing is taken off together with the distributor line and any heating jacket attached thereto, thereby permitting access to the screw casing and removal of the screw therefrom. In the other method, the screw is withdrawn from the opposite end of its cylindrical casing, i.e. from the feed end where a gear mechanism is mounted for rotation of the screw.

The first method requires a considerable expenditure of time and labor and results in a correspondingly long period of time during which several spinning heads must be shut down. The second dismantling method has proven unsatisfactory because some of the polymer adhering to the worm or screw tends to get into the gear mechanism where it hardens and becomes extremely difficult to remove. Also, there must be sufficient space behind the feed end of the screw housing to use this second method, thereby preventing a back-to-back arrangement of a number of extruders which is desirable for convenience in supplying fresh polymer to a series of extruders.

Still another technique requires the screw cylinder or casing to be drawn off the worm, but this method also has the disadvantage of a time-consuming dismantling of the screw housing and/or the distributor line. Moreover, the space requirement is also apt to be very great in this case.

The principal object of the present invention is to provide an improved construction and arrangement in a spinning extruder whereby the conveyor screw can be easily removed within a short period of time at the head or exit end of the screw housing, but without a complete disassembly of the headpiece and without removal or disconnection of the distributor line and/or accompanying heating jackets.

Another object of the invention is to provide a screw extruder for spinning filaments in which the polymer being extruded can be continuously heated during its flow from the screw through the distributor line to one or more spinning heads and in which the screw is readily removed for cleaning without disturbing the heating means.

In particular, it is an object of the invention to provide special means for deflecting the flow of the polymer from the screw into the distributor line, said deflection means being easily removed for cleaning together with said screw without requiring disassembly of the other structure of the extruder combined therewith.

These and other objects and advantages of the invention are achieved as disclosed in the following detailed description of the invention.

It has now been found, in accordance with the invention, that the operation and maintenance of a screw extruder for spinning filaments can be considerably improved by using, in combination with a conventional conveyor screw contained in a housing and a distributor line to transfer molten extruded polymer from the screw to one or more spinning heads, a headpiece at the exit end of said screw wherein an outer headblock is attached as an extension to the screw housing and contains an axial bore therethrough, i.e. on the same axis as the screw, this axial bore having a diameter sufficiently greater than the diameter of the screw to permit the screw to be removed outwardly through this bore. In addition, the headpiece essentially includes an inner core member or plug which is removably mounted in the axial bore of the headblock and which contains a fluid passageway interconnecting the exit opening of the screw with the distributor line. This distributor line is preferably formed in part by a fluid passageway in the headblock located at an angle to the axial bore, e.g. at a right angle.

The inner core member fits snugly in the headblock as a closure means or head cap during normal extrusion and its passageway or enclosed conduit deflects the molten polymer from the exit opening of the screw downwardly or outwardly into a distributor line. When this core or plug insert is removed, the screw can very quickly and simply be pulled out or pushed forward through the axial bore of the outer headblock. This arrangement of the deflection channel or conduit inside the removable core member has an additional advantage in that the point of deflection normally tends to collect and hold the molten polymer, but once this core is removed, the deflection point is very accessible for thorough and rapid cleaning.

Moreover, since it is frequently desirable to measure the temperature or other characteristics of the polymer melt as it exists from the screw casing, it is advantageous to provide the inner core member with means for the reception of one or more measuring instruments. Thus, the inner core may contain an opening extending from its exposed face into its fluid deflecting passageway, this opening being so constructed and arranged as to provide means for interchangeably receiving a wide variety of measuring devices in the form of probes, rods, sample taps or the like. For example, the opening can be fitted with a threaded adapter or series of adapters capable of receiving measuring devices of various threaded dimensions.

A particularly advantageous feature of the present invention resides in a construction of the headpiece such that it contains a heating channel which is placed within or at least partially around the headblock, i.e. separate from but in proximity to the inner core member, and which is interconnected with either or both of the heating jackets around the screw and the distributor line for the flow of a fluid heat exchange medium therebetween. Since the outer portion of the headpiece including the headblock is not taken off during withdrawal of the screw, the continuous heating systems or interconnected heading circuits of the improved apparatus need not be disturbed or disconnected at any time.

The improved apparatus of the present invention is further illustrated by way of example in the accompanying drawings in which similar parts are designated by the same reference numerals and in which.

Figure 2:
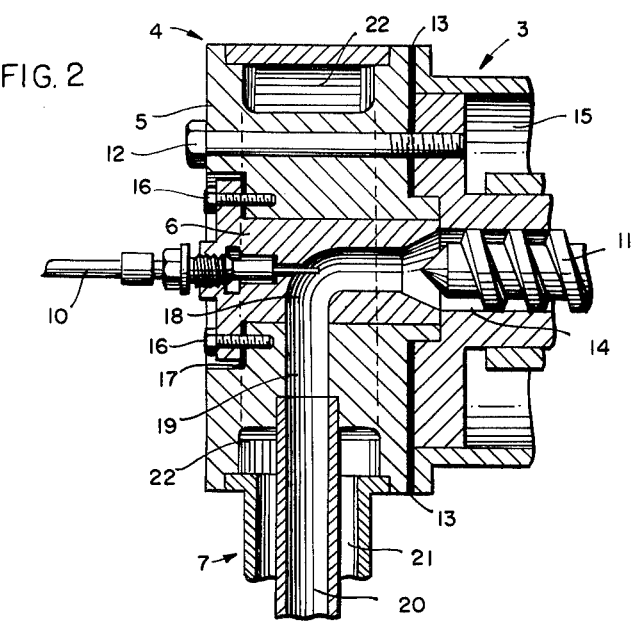
FIG. 2 is a vertical cross-sectional view through the longitudinal axis of the screw, illustrating one embodiment of the construction of the headpiece as it is combined with the screw and distributor line in accordance with the invention.
Figure 3:
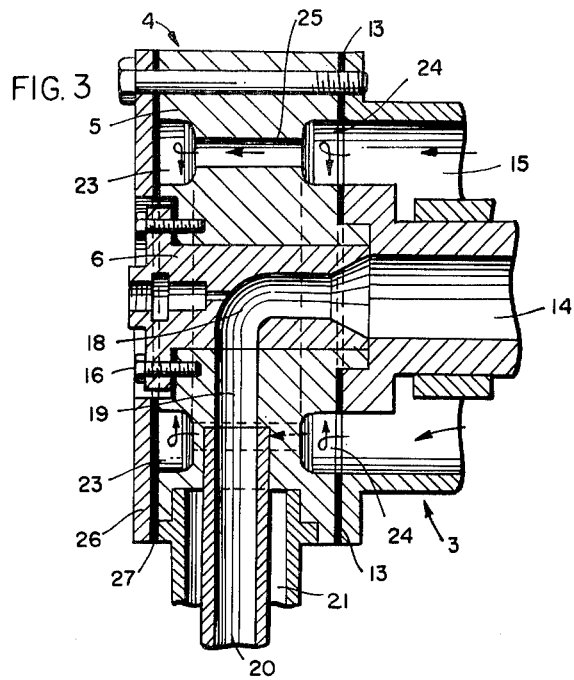
Figure 4:
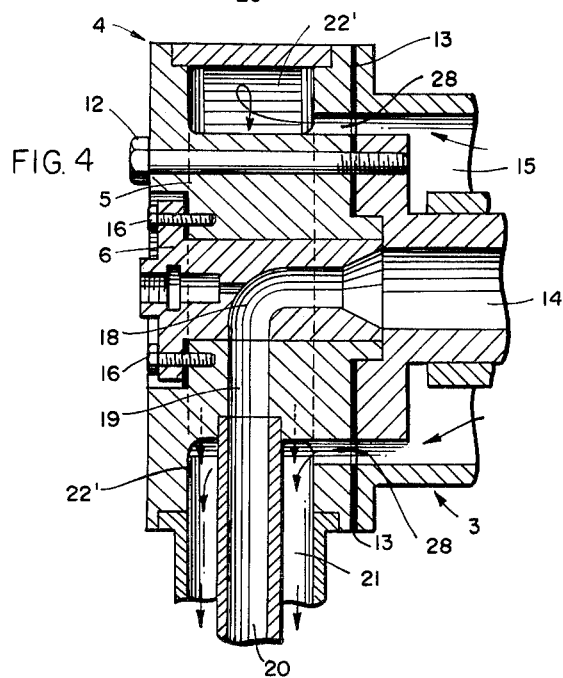

FIG. 3 is a vertical cross-sectional view of another headpiece similar to that shown in FIG. 2, but with certain elements omitted and with a variation in the location of the heating channel contained therein; and FIG. 4 is a vertical cross-sectional view of still another headpiece similar to the preceding figures, with certain elements again omitted and with still another location and arrangement of the heating channel contained therein.

Figure 1:
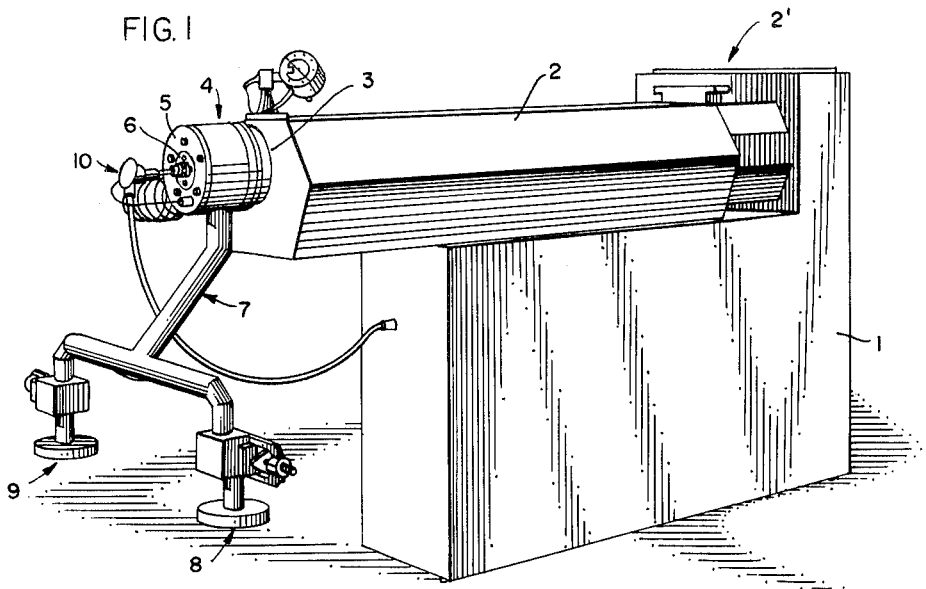
FIG. 1 is an over-all perspective view of the screw extruder adapted for spinning filaments shown in its completely assembled form so as to portray the external appearance of the apparatus.

Referring now to these drawings, the "spinning extruder" of FIG. 1 has a generally rectangular supporting base 1 and screw housing 2 which are conventional as means to support and enclose a conveyor screw and drive means such as a motor and gear mechanism (not shown) located at the feed end 2' of the screw housing. In the particular device shown in FIG. 1, the outer housing 2 encloses an inner housing or cylindrical casing 3 extending longitudinally therefrom at the exit end of the screw. The casing 3 contains a heating jacket and the outer housing 2 provides an insulating space around the casing and over most of its length. A headpiece 4 including the headblock 5 and the core insert member 6, attached as an extension of the jacketed housing or casing 3, serves to provide a deflected passageway to lead the molten polymer from the screw into the jacketed distributor line 7 and then to the spinning heads 8 and 9 located at the end of the branched distributor.

Suitable measuring and/or control devices can be mounted on the housing or in the headpiece as conventional means of determining and/or controlling the heating system within various heating jackets or heating channels. In addition, it is especially desirable to provide means in the inner core 6 for receiving a measuring instrument 10, such as a thermometer, thermostat, pressure meter or the like.

FIGS. 2, 3 and 4 illustrate different preferred embodiments of the combination of the conveyor screw 11 and its housing or cylindrical casing 3 with the headpiece 4 and the distributor line 7, the invention residing in the particular construction and arrangement of these elements rather than in the remainder of the apparatus as shown more generally in FIG. 1.

According to FIG. 2, the headpiece 4 consists essentially of a headblock 5 fastened to the cylindrical casing 3 by any suitable fastening means such as a number of bolts or screws 12, a gasket or annular sealing ring 13 preferably being inserted to ensure a pressure-tight fitting. The casing 3 forms the cylindrical channel 14 in which the screw 11 rotates for conveying and mixing the polymeric material in the extrusion process. In addition, a hollow space formed by the jacket 15 of the casing is employed as a means of circulating a heating fluid.

In alignment with the screw channel 14, the inner core or plug 6 is removably mounted by means of screws 16, preferably with the insertion of an annular sealing ring 17, to the recessed portion of the headblock 5 and fits snugly in an axially bored opening running through the headblock. The diameter of this core member and the axial bore of the headblock in which it fits is preferably slightly larger than the inner diameter of the screw channel although it is feasible to make these diameters equal to each other so long as the screw can be extracted through the axial bore once the core member is detached.

A deflected channel or fluid passageway 18 is provided within the core or plug 6 as an extension of the screw channel 14 and as a means of directing the flow of molten polymer radially outwardly through the headblock passageway 19 into the distributor line 20. This distributor line is surrounded by a heating jacket 21 which in turn is in fluid communication with a concentric annular heating channel 22 formed in the headblock 5. The measuring instrument 10 with its probe projects into the channel 18 at the point of deflection and can be replaced with another instrument or can be removed together with the core member 6.

In FIG. 3, the screw and measuring instrument have been omitted, and the arrangement of the essential component parts of the apparatus is otherwise substantially identical to that shown in FIG. 2, except that the heating jacket 15 is in fluid communication with oppositely disposed heating channels 23 and 24 interconnected by a number of tubular passageways 25 spaced at intervals around the headblock 5 so as not to interfere with the attachment of the distributor line 20 with its jacket 21. The outermost channel 23 is enclosed by the faceplate 26 and gasket 27.

Likewise, FIG. 4 illustrates another similar embodiment in which the annular heating channel 22' in the headblock 5 is interconnected with both the heating jacket 15 around the screw channel 14 and the heating jacket 21 around the distributor line 20. In this case, the heating channel 22' is in fluid communication with the jacket 15 by means of a plurality of annularly spaced openings 28 on the inner face of the headblock 5, corresponding openings being provided in the gasket or sealing ring 13. The distributor heating jacket 21 is attached and connected in substantially the same manner as shown in FIG. 2.

Any suitable heat-exchange fluid such as steam or diphenyl can be used to supply heat through these heating jackets or channels to the polymer as it is extruded through the screw, the passageway in the headpiece and outwardly through the distributor line. It is especially desirable to use a single enclosed heating circuit from at least the last stage of the conveyor screw through the headpiece and the distributor line to the spinning heads, because the polymer melt can then be maintained under a substantially uniform and carefully controlled temperature during its transfer from the screw to the spinning heads.

With the illustrated arrangements of various heating circuits or other similar constructions, it will be apparent that the core or plug 6 can be dismantled for removal of the screw without interfering with any of the enclosed heating circuits. Thus, even though it is occasionally necessary to shut down an extruder to interchange or clean the screw, it is not necessary to drain the heating circuits or to run the risk of inadvertently opening a jacket or channel containing a heat-exchange liquid. Furthermore, this maintenance of heating circuits in a fixed position during interchanging or cleaning operations considerably facilitates and simplifies the dismantling procedure.

In order to remove the screw 11 from its normal position in the casing 14 as shown in FIG. 2, it is not necessary to release the entire headpiece 4 as in previously known constructions. Instead, only the inner core member or plug 6 is released together with the measuring instrument 10, so that the screw is easily extracted through the axial bore of the headblock 5 which has been opened in this manner. Since the distributor line and the jacketed casing of the screw likewise do not need to be disassembled, interchanging of the screw proceeds very quickly and the extrusion process is only briefly interrupted. Furthermore, a large number of such spinning extruders can be advantageously arranged in a relatively smaller space so as to give a compact and efficient operation of these units in a commercial production of synthetic polymer filaments. Adjoining units are not disturbed when removing the screw from one unit, because it is not necessary to have free access except at the exit end of the screw and no space is required to dismantle larger sections of the apparatus such as the screw housing or its cylindrical casing.

The invention is hereby claimed as follows:

1. In a screw extruder for spinning synthetic polymer filaments having a housing containing an conveyor screw and a distributor line for transfer of molten extruded polymer from said screw to at least one spinning head, the improvement comprising:

a headpiece at the exit end of said screw, said headpiece including an outer headblock attached as an extension to the screw housing and containing an axial bore therethrough of greater diameter than the diameter of said screw; and an inner core member removably mounted in said axial bore and containing a fluid passageway interconnecting the exit opening of the screw with said distributor line.

2. A screw extruder as claimed in claim 1 wherein said distributor line is formed in part by a fluid passageway in said headblock located at an angle to said axial bore.

3. A screw extruder as claimed in claim 1 wherein said inner core member has an opening extending from an exposed face thereof into said fluid passageway with means for interchangeably receiving measuring instruments in said opening.

4. A screw extruder as claimed in claim 1 wherein said screw housing includes a heating jacket around said conveyor screw and said headpiece contains a heating channel, said jacket and said channel being interconnected for the flow of a fluid heat exchange medium therebetween.

5. A screw extruder as claimed in claim 1 wherein said distributor line is enclosed by a heating jacket and said headpiece contains a heating channel, said jacket and said channel being interconnected for the flow of a fluid heat exchange medium therebetween.

6. A screw extruder as claimed in claim 1 wherein said screw housing includes a heating jacket around said conveyor screw, said headpiece contains a heating channel and said distributor line is enclosed by another heating jacket, each of said heating jackets being interconnected with said heating channel for the flow of a fluid heat exchange medium therebetween.

References Cited by the Examiner

UNITED STATES PATENTS

| | | | |
|---|---|---|---|
| 2,597,553 | 5/1952 | Weber | 18—12 |
| 2,773,283 | 12/1952 | Malamound et al. | 18—12 X |
| 2,952,871 | 9/1960 | Loeser | 18—12 |

WILLIAM J. STEPHENSON, *Primary Examiner.*